United States Patent
Weinzweig et al.

(10) Patent No.: US 7,177,664 B2
(45) Date of Patent: Feb. 13, 2007

(54) BLUETOOTH INTERFACE BETWEEN CELLULAR AND WIRED TELEPHONE NETWORKS

(75) Inventors: Carmi Weinzweig, Winter Garden, FL (US); Ronald Lachman, 3140 Whisperwoods Ct., Northbrook, IL (US) 60062-6400

(73) Assignee: Ronald Lachman, Northbrook, IL (US)

( * ) Notice: Subject to any disclaimer, the term of this patent is extended or adjusted under 35 U.S.C. 154(b) by 647 days.

(21) Appl. No.: 10/705,428

(22) Filed: Nov. 10, 2003

(65) Prior Publication Data

US 2005/0101261 A1    May 12, 2005

(51) Int. Cl.
*H04M 1/00* (2006.01)
(52) U.S. Cl. .............. 455/554.1; 455/554.2; 455/555; 455/41.2; 455/74.1
(58) Field of Classification Search ............. 455/554.1, 455/554.2, 555, 41.2, 74.1
See application file for complete search history.

(56) References Cited

U.S. PATENT DOCUMENTS

| | | | |
|---|---|---|---|
| 5,311,570 A * | 5/1994 | Grimes et al. ............... | 455/417 |
| 5,390,233 A * | 2/1995 | Jensen et al. ............... | 455/417 |
| 5,544,226 A * | 8/1996 | Weis et al. .................. | 455/555 |
| 5,903,835 A * | 5/1999 | Dent .......................... | 455/427 |
| 6,324,410 B1 | 11/2001 | Giacopelli et al. | |
| 6,405,027 B1 | 6/2002 | Bell | |
| 6,430,395 B2 | 8/2002 | Arazi et al. | |
| 6,452,910 B1 | 9/2002 | Vij et al. | |
| 6,498,938 B1 * | 12/2002 | Morrow, Sr. ................. | 455/557 |
| 6,600,734 B1 | 7/2003 | Gernert et al. | |
| 6,741,835 B2 * | 5/2004 | Pulver ........................ | 455/3.05 |
| 6,778,654 B1 * | 8/2004 | Takatori et al. ......... | 379/212.01 |
| 6,832,082 B1 * | 12/2004 | Ramaswamy et al. ...... | 455/411 |
| 2002/0115471 A1 | 8/2002 | De Loye et al. | |
| 2002/0191595 A1 | 12/2002 | Mar et al. | |
| 2003/0054767 A1 | 3/2003 | Mandhyan et al. | |
| 2003/0134630 A1 | 7/2003 | Scheinert et al. | |
| 2004/0235519 A1 * | 11/2004 | Frielink et al. ............. | 455/557 |
| 2006/0068774 A1 * | 3/2006 | Kerr ........................ | 455/426.1 |

* cited by examiner

*Primary Examiner*—Matthew Anderson
*Assistant Examiner*—Minh Dao
(74) *Attorney, Agent, or Firm*—Charles G. Call (57) ABSTRACT

An interconnect device for connecting a Bluetooth compliant cellular telephone to one or more wired telephones on an existing wired network. The interconnect device includes an interface to the wired network that emulates the behavior of a standard trunk line to a central office and includes a Bluetooth transceiver which communicates via short-range radio signaling with a Bluetooth transceiver in the cellular telephone. The interconnect device permits an outgoing call to be placed via the cellular telephone network from a conventional wired telephone by sending dial tone to the wired telephone when the cellular telephone is in range and not in use, accepting a called number from the wired telephone to the cellular telephone to initiate an outgoing call, and establishing a voice link between the wired telephone and the remote answering party via the Bluetooth transceivers and the cellular network. Incoming calls to the cellular phone are intercepted by the interconnect device which applies ringing signals to the connected wired telephones, any of which may be taken off-hook to answer the incoming cellular call.

19 Claims, 5 Drawing Sheets

BLUETOOTH INTERFACE BETWEEN CELLULAR AND WIRED TELEPHONE NETWORKS

FIELD OF THE INVENTION

This invention relates to telephone systems.

BACKGROUND OF THE INVENTION

Cellular telephones are typically used by travelers who are away from their home or office returning travelers typically prefers to use a conventional wired telephone system and leave their cellular phones turned OFF to conserve battery life. As a result, outside callers who place a call to the cellular phone number are unable to reach the cell phone owner, and are required to leave a voice mail message or place a second call via the landline to the owner's conventional home or office phone.

A cellular phone owner at home or at the office often uses the cellular phone only when all other wired lines are busy, and only after the inconvenience of fetching the cellular phone from a briefcase or a charging cradle in another room.

There is accordingly a need for an arrangement that would permit a cellular telephone owner who is at home or in the office to use a conventional wired telephone to receive incoming calls to the cellular phone, or to place outgoing calls over the cellular network when all other wired lines are in use.

There is a further need for a device which would provide those capabilities to a cellular telephone owner in a way that is easy to install and easy to use without special expertise.

SUMMARY OF THE INVENTION

In its preferred embodiment, the present invention takes the form of an interconnect device for coupling a cellular telephone to at least one wired telephone on a wired network. The wired network may consist of one or more parallel wired lines connecting one or more wired telephones, or to a PBX or key telephone system. The interconnect device effectively acts as an outside trunk line which provides connections to called and calling parties via the cellular telephone. The trunk line provided by the cellular phone may supplement or replace a conventional wired trunk line to a central office in the public switched telephone network.

The interconnect device includes a first short-range radio transceiver for exchanging voice and data signals with a second short-range radio transceiver in the cellular telephone. In the preferred embodiment, both the first and second transceivers operate in accordance with the Bluetooth Specification and provide both data and voice channels between the wired and cellular telephones.

The interconnect device further includes an interface connected between said wired network and the transceiver in the interconnect device for emulating a wired line to a telephone central office. The interface includes means for indicating the availability of an idle line (typically by transmitting a dial tone to the connected wired telephone) when the second transceiver in the cellular phone is within communicating range of the first transceiver and the cellular telephone is not already in use. The interconnect device further includes means for receiving a telephone number to be called from the wired telephone and for means for transmitting that called number via the two transceivers to the cellular telephone to initiate an outgoing call The interconnect device further includes means for establishing an audio transmission channel between the cellular phone and the wired network via the two transceivers, and for signaling the cellular telephone via the two transceivers to terminate an active call when the connected wired telephone goes on-hook.

The interconnect device further includes means for handling an incoming call to the cellular phone from an outside caller. The interconnect device receives notification of the incoming call via the two transceivers and applies a ringing signal via the interface and the wired network to the wired telephones on the line. When one of the connected wired telephones goes off-hook, the interface device establishes an audio transmission channel between the cellular phone and said wired network via the two transceivers.

The interconnect device accordingly emulates the behavior of a standard wired telephone trunk line to a central office. A cellular telephone owner can connect the interconnect unit by means of standard modular telephone jack to existing household or office telephone wiring network, or to a PBX, a key telephone system, or a variety of other existing wired telephone network facilities. Installation and operation of the interconnect device requires no special expertise and can be performed using standard modular connectors. Outside callers can reach the cellular phone owner at a single telephone number (the cellular phone number) regardless of whether he or she is traveling or at home or in the office. Whenever the cellular phone is within range of the interconnect device, it may be used as an "outside line" from any wired telephone connected to the interconnect device. When the owner is at home or in the office, an incoming call can be received at any connected wired telephone, and an outgoing call can be placed using the cellular phone line as an additional outside line from any connected wired telephone. The superior interface of the wired phones can be used to provide call transfer functions, allow multiple users to share the line, and connect to high quality speakerphones. If the cellular phone owner subscribes to a wireless phone plan that includes long distance service and/or free calls on nights and weekends, the interconnect device contemplated by the present invention permits users to take advantage of these services when calling from their wired system.

These and other features and advantages of the present invention may be better understood by considering the following detailed description of a specific embodiment of the invention.

BRIEF DESCRIPTION OF THE DRAWINGS

In the detailed description which follows, frequent reference will be made to the attached drawings, in which.

DETAILED DESCRIPTION

The preferred embodiment of the invention allows any Bluetooth wireless (cellular) telephone to act as a trunk line for a PBX or other wired telephone system. Using the invention, a mobile worker can use a cellular telephone when out of the office, but can use the same cellular telephone in ways that take advantage of all the benefits of a wired office or home system when it is available.

As used herein, the term "cellular telephone" should be understood to refer to any mobile wireless telephone capable of communicating via a wireless communications system with remotely located parties, and includes both analog and digital cellular telephone systems including PCS, GSM and cellular radio systems, as well as other mobile radio telephone systems.

Figure 1:
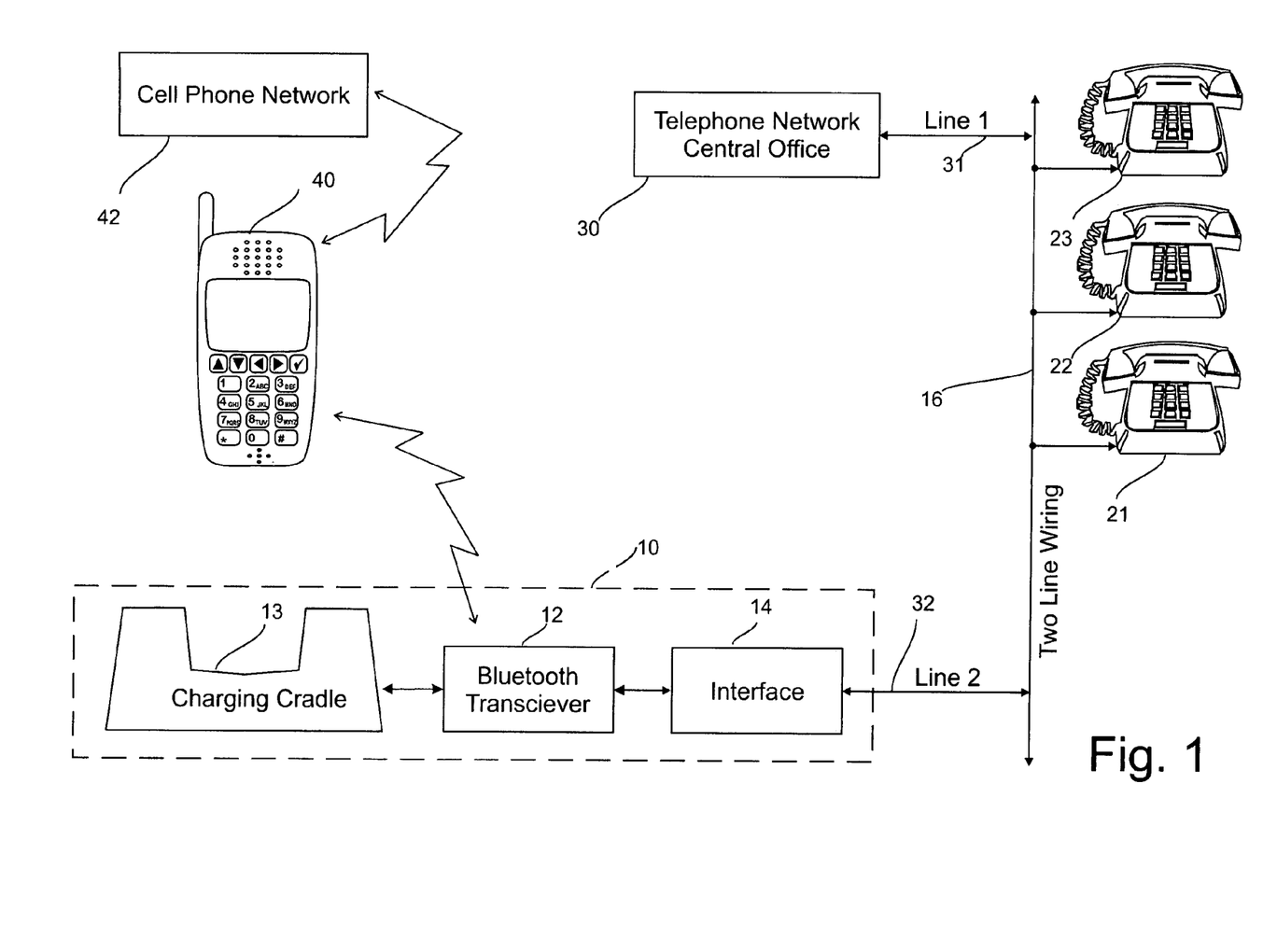
FIG. 1 is a block diagram illustrating an interconnect device for connecting a cellular telephone to a wired telephone system.

As illustrated in FIG. 1, the interconnect device 10 contemplated by the invention consists of a Bluetooth compliant transceiver 12 and an interface 14 connected between the transceiver 12 and a wired telephone network consisting of two-line wiring 16 to which several two-wire line telephones 21, 22 and 23 are connected. The interconnect device may include a charging cradle 13 designed to receive and establish an electrical connection to charge the battery of the cellular phone 40 when the cellular phone owner is not traveling. The interconnect device may also include a power supply (not shown) for producing operating power needed by the transceiver 12, the charging cradle 13 and the interface 14. Each of the wired two-line telephones seen at 21, 22 and 23 is conventional and includes switch-hook (on-hook when the telephone is not in use), a dialing circuit (a DTMF tone generator or a rotary pulse dialer), a ringer, a microphone, and a speaker (for the ear-piece). A line selection switch or pushbutton on each wired telephone allows that telephone to be selectively connected to either Line 1 (seen at 31) or Line 2 (seen at 32). Line 1 provides access to the public switched telephone network (PSTN) via a central office 30. Line 2 provides access via the interconnect device 10 to the cellular phone network. Each telephone 21–23 is adapted to respond to ringing signals applied to either Line 1 or Line 2, and may include a visual indicator to indicate when a particular line is in use or ringing.

The Bluetooth compliant transceiver 12 communicates over a short-range radio link 35 with the short-range Bluetooth transceiver in the cellular telephone 40 which communicates with the cellular telephone phone network 42. The short range radio link 35 transmits both control signals and audio voice signals. A mobile user can use the cellular telephone 40 in the normal way when away from her home or office. When the cellular telephone is within range of the interconnect device 10, it may be used to provide an additional communications pathway on line 2 to any of the two-line telephones 21, 22 or 23 connected to the two-line wiring 16.

The Bluetooth compliant transceiver 12 may be implemented with existing integrated circuit products, such as the Motorola MC71000 Bluetooth Baseband Controller, the Motorola MC13180 Bluetooth RF Transciever Integrated Circuit, the Motorola MRFIC2408 External Power Amplifier IC, and the Motorola MC13181 power management chip. A software suite that provides a Java API for controlling the operation of the Motorola Bluetooth IC Platform from a controller that operates a Java Virtual Machine is also available from Motorola, Inc. (http://www.motorola.com/semiconductors).

The interconnect device 10 seen in FIG. 1 emulates a standard analog phone line (loopstart, groundstart or kewlstart). By selecting Line 2 at any of the wired telephones 21–23 when the cellular telephone 40 is not in use, a user can select Line 2 (at 32) to obtain a dial tone, dial an outgoing call, complete the call through the cellular network, and terminate the call in the same way that a call would be completed through Line 1 connected to the telephone central office 30. Incoming calls received by the cellular telephone 40 may be answered at any of the wired telephones 21–23 on Line 2 in the same way that conventional incoming calls via Line 1 are answered.

Figure 2:
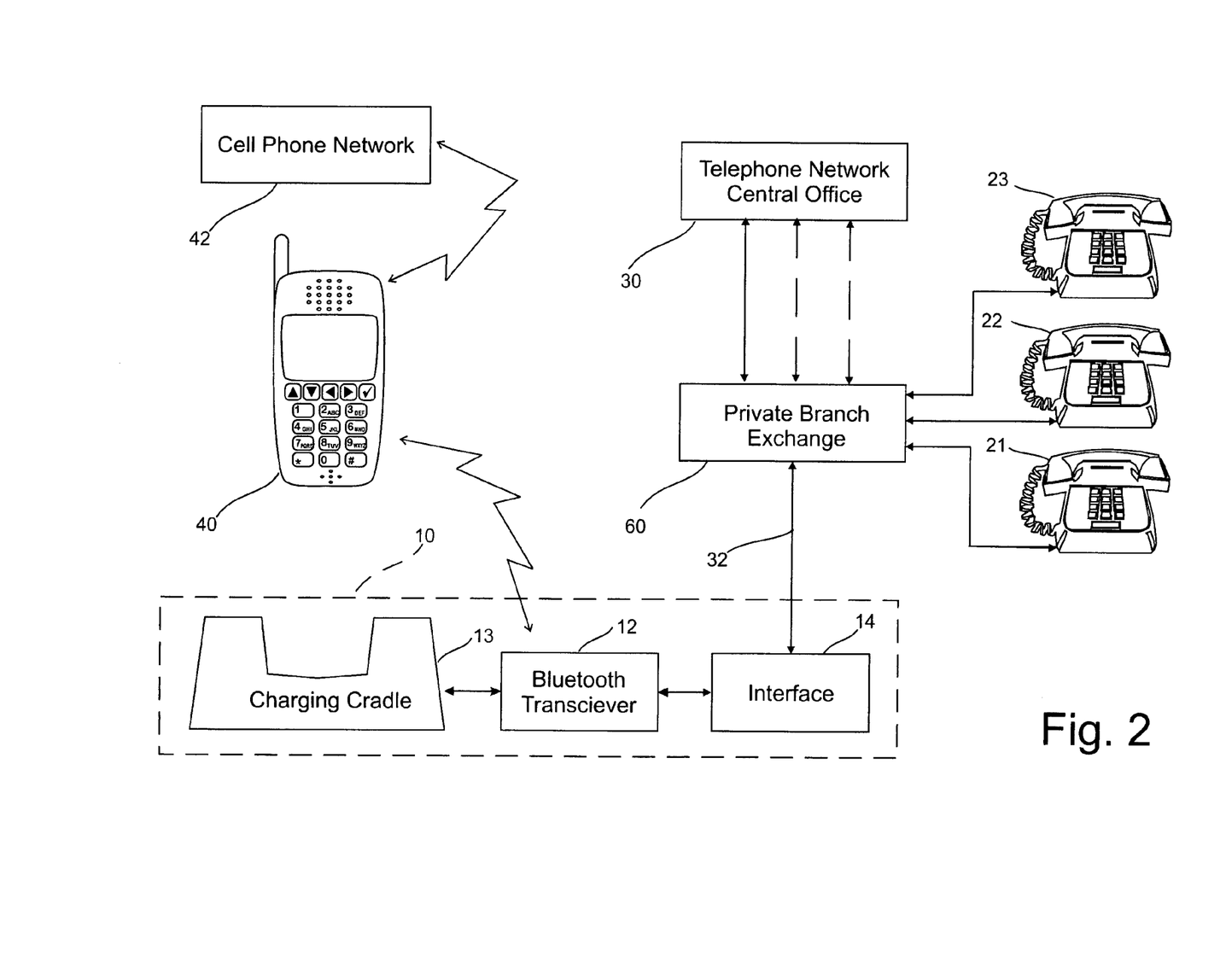
FIG. 2 is a block diagram of an interconnect device used to provide an additional trunk line connection to a PBX.

As illustrated by the alternative arrangement seen in FIG. 2, the interconnect device 10 may also be connected to provide a line that may be shared among many devices connected together by a PBX or key system illustrated at 60. The interconnect device 10 provides an additional two-wire trunk or dial tone line that recognizes an "off hook" situation when a connected telephone switch-hook that normally puts a 1000-ohm short across the tip and ring line when on-hook breaks the connection when the handset is lifted. This conventional loop start line is the most common type of line and is also called a POTS (plain old telephone system) line or "plain-service" line. Other types of lines or trunks are: ground start and E&M trunks (ear and mouth, an old 6-wire version of a T1), ISDN, PRI, and ISDN BRI (e.g. Lucent 5ESS, or NI-1), PRI (e.g. NI-2) for multiple phone configurations, SIP/MCGP/H.264 or VOIP protocols (e.g. SIP, MGCP, H.264, etc.). Depending on the application, the interface 14 can be configured to permit the interconnect device 10 to be used with any of these wired systems to emulate an outgoing trunk line. An interconnect device may include a configurable interface which permits it to work with a selected one of several different environments, and the configurable interface may include a display and keyboard/keypad to facilitate the configuration process and/or to provide other functionality as noted below.

As seen in FIG. 1, the interface 14 includes a controller which is connected to the Bluetooth transceiver 12, an ON hook/OFF hook detector for detecting the status of line 2 at 32, a dial tone source for signaling a connected OFF hook telephone that the cellular telephone is available for use and is located within range of the interconnect device 10, a ringing signal source for signaling the telephones connected to line 2 that an incoming call has been received by the cellular telephone 40.

Figure 3:
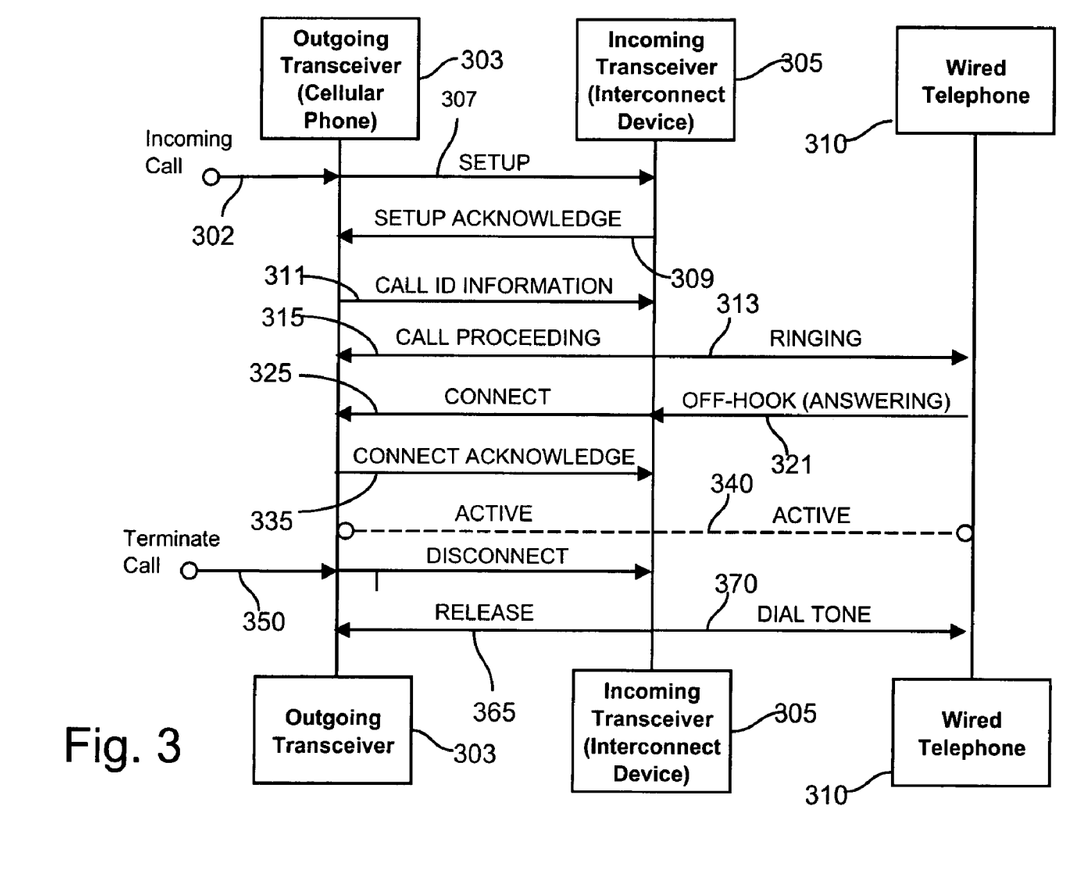
FIG. 3 is a message exchange diagram illustrating the manner in which incoming calls received by the cellular telephone are handled.

The message exchange diagram presented in FIG. 3 illustrates the manner in which the interconnect device 10 handles an incoming call received by the cellular phone 40. The Bluetooth transceiver built into the cellular phone (the "outgoing" transceiver 303 in FIG. 3) and the Bluetooth transceiver in the interconnect device (seen at 12 in FIGS. 1 and 2 and the "incoming" transceiver 305 in FIG. 3) both employ the Bluetooth Telephony Control protocol Specification Binary (TCS Binary) to manage both a data link and a baseband audio channel. The Telephony Control Prototype Specification which defines the call control signaling for the establishment of speech and data calls between Bluetooth devices is described in detail in Part F:3 of the Specification of the Bluetooth System, Volume 1, Version 1.1 (Feb. 22, 2001).

When a call is placed to a Bluetooth compatible cellular telephone as indicated at 301, the Bluetooth transceiver in the cellular phone is the "outgoing" device seen at 303 and the Bluetooth transceiver 12 in the interconnect device 10 is the "incoming" transceiver seen at 305. When the incoming call is detected, the cellular phone notifies the outgoing transceiver 303 which initiates call establishment by sending a SETUP message 307 to the incoming transceiver 305. The SETUP message contains the information needed by the incoming transceiver 305 to initiate the call, and the incoming transceiver 305 responds with a SETUP ACKNOWLEDGE message 309. The SETUP message may include caller identification or ANI information if available, or that information may be passed to the incoming transceiver 12 in INFORMATION messages exchanged at 311 sent later after SETUP is complete.

When the incoming transceiver 12 determines that all information needed to establish a call has been received, it signals the interface 14 which applies a ringing signal to the connected wired telephone 310 as seen at 313, and sends a CALL PROCEEDING message 315 to the outgoing transceiver. When the call is answered by one of the connected telephones 21–23 going off-hook at 321, the interface 14 signals the incoming transceiver 305 which sends a CONNECT message 325 to the outgoing transceiver 303. When a CONNECT ACKNOWLEDGE message 335 is received from the incoming transceiver, both transceivers enter the ACTIVE state as indicated at 340 and the call proceeds via a parallel voice channel established between the two transceivers. While the call is active, the two transceivers can continue to exchange information messages in the parallel asynchronous data channel provided between the two Bluetooth transceivers.

If the call is terminated by the caller as seen at 350, the outgoing transceiver 303 in the cellular telephone sends a DISCONNECT message 360 to the incoming transceiver 305. If the call is terminated by the called party who places one the wired telephone 310 on-hook, the incoming transceiver 305 sends a DISCONNECT message (not shown) to the outgoing transceiver. To clear the call, as shown in FIG. 3, the incoming transceiver 305 sends a RELEASE message 365 to the outgoing transceiver and signals the interface 14 to supply a dial tone 370 to any connected wired telephone that remains or goes off-hook, indicating readiness to accept an outgoing call.

Figure 4:
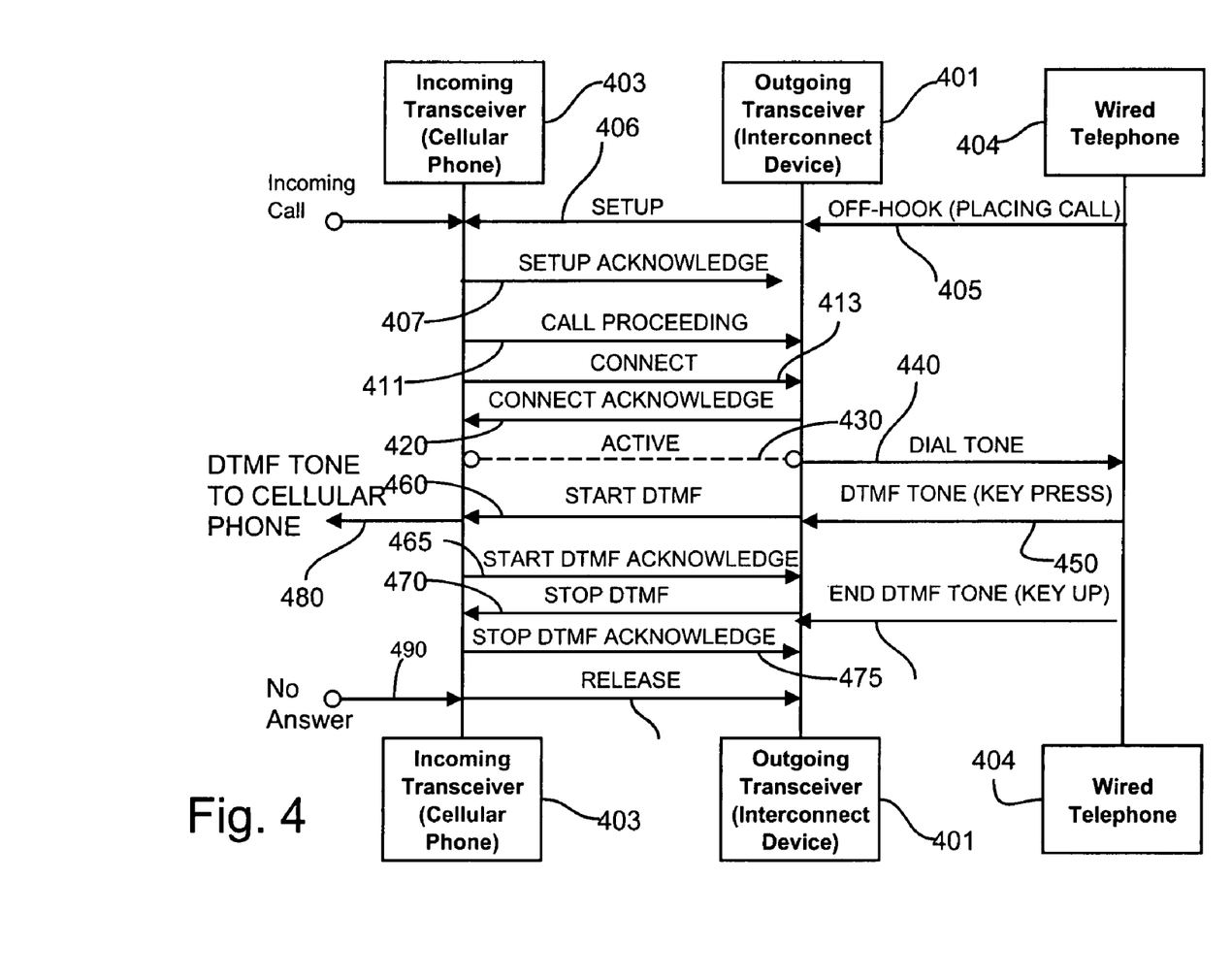
FIG. 4 is a message exchange diagram illustrating the manner in which outgoing calls placed from a wired telephone through the cellular phone are handled.

The message exchange diagram of FIG. 4 depicts the manner in which calls may be initiated from a connected wired telephone seen at 404. In this case, the Bluetooth transceiver 12 in the interconnect device 10 acts as the "outgoing" transceiver shown at 401 in FIG. 4, and the Bluetooth transceiver in the cellular telephone 40 becomes the "incoming" transceiver seen at 403 in FIG. 4.

When an off-hook condition for the connected wired telephone 404 is detected by the interface 14 at 405, the outgoing transceiver 401 initiates call establishment by sending a SETUP message 406 to the incoming transceiver 403 in the cellular phone which (if available) responds with a SETUP ACKNOWLEDGE message 407. If no SETUP ACKNOWLEDGE message is received within an allocated timeout period, indicating that no in-range cellular phone is available to handle the outgoing call, the outgoing transceiver 401 issues a DISCONNECT message (not shown) to clear the call.

If the cellular phone is in range and available for use, and the incoming transceiver 403 in the cellular phone 40 determines that all information needed to establish a call has been received in the SETUP message 406, it signals the outgoing transceiver 401 in the interconnect device 10 by sending a CALL PROCEEDING message 411 followed by a CONNECT message 413 to the outgoing transceiver 401. The outgoing transceiver 401 in the interconnect device 10 responds with a CONNECT ACKNOWLEDGE message 420. When the CONNECT ACKNOWLEDGE message 420 is received from the outgoing transceiver 403, both transceivers enter the ACTIVE state 430 and the call proceeds via a parallel voice channel established between the two transceivers. While the call is active, the two transceivers can continue to exchange information messages in the data channel.

The outgoing transceiver 401 signals the interface 14 that voice channel has been activated, and the interface 14 sends a dial tone as seen at 440 to the connected wired telephone 404, indicating that the cellular phone is available for an outgoing calls. If the cellular phone 40 is in use, a "busy" signal is applied to the line 32. If the cellular phone is not within range, no dial tone is sent.

When the connection is established between the outgoing and incoming transceivers which enter the ACTIVE state, a DTMF start and stop procedure is entered. When the user of the wired telephone 404 hears the dial tone applied at 440, an outgoing call may be placed by sending DTMF signals (or dial pulses) to the interface 14 from the wired telephone 404. The interface 14 sends each DTMF tone (or dial pulse group) to the outgoing transceiver 401 in the interconnect unit. When the user generates a DTMF tone (by pressing a key on one of the telephones 21–23), or sends a sends a dial pulse group, as indicated at 450 in FIG. 4, the outgoing transceiver interprets the received signal and sends the value of the digit in a START DTMF message 460 to the incoming transceiver, which responds with a START DTMF ACKNOWLEDGE message 465. When the user of the wired telephone ends the DTMF tone (key up), the outgoing transceiver sends a STOP DTMF message 470 to which the incoming transceiver responds with a STOP DTMF ACKNOWLEDGE message 475. The START DTMF message contains the value of the DTMF digit or dial pulse group, to which incoming transceiver 403 in the cellular phone responds by generating a DTMF tone at 480 which is then transmitted by the cellular phone 40. The STOP DTMF message 470 when received terminates the tone generation.

If the call placed by the cellular phone is not answered as indicated at 490, the incoming transceiver 401 at the cellular phone sends a RELEASE message to the outgoing transceiver in the interconnect device to begin the process of clearing the call. The call may also be terminated by either transceiver sending a DISCONNECT message (call clearing messages not shown in FIG. 4).

The interconnect device 10 may serve several cellular telephones. Cellular telephones identify themselves to the cellular phone network using two unique values: (1) a Mobile Identification Number (MIN), a ten-digit number that is similar to a landline phone number in that it has a three-digit area code and a seven-digit phone number, assigned by the cellular service provider and can be when changing service providers and (2) an Electronic Serial Number (ESN), a 32-bit binary number assigned by the manufacturer that is never changed. When a cell phone is signed up for service, the service provider assigns a new MIN to the phone and updates its customer database to associate that MIN with the phone's ESN. Then, every time the cell phone places or receives a call, the customer database in the cellular telephone network is searched and the call is allowed if the transmitted MIN-ESN pair is found.

Accordingly, the interface 14 may be programmed to confirm the identify of and permit communication with only a specific cellular phone having a particular MIN-ESN pair, or with any one of several specific cellular phones whose MIN-ESN pairs has been registered. When a number of different Bluetooth compliant cellular telephones are potentially available for connection to a wired network, such as a PBX, the transceiver 12 may operate as a Wireless User Group (WUG) master, with the Bluetooth transceivers in the cellular telephones operate as members of the WUG. The Group Management (GM) capabilities specified in the Telephone Control Protocol Specification (TCS Binary) enable one device requesting access rights to use the telephony services of another device, including verification of MIN-ESN pair information to insure that only a properly registered cell phone is permitted access to the interconnect device functionality. Alternatively, a set of separate transceivers, each of which is dynamically allocated to a particular cellular phone that is in range at the time of an incoming call to that cellular phone, or dynamically allocated to an available cellular phone when an outgoing call is placed from a wired telephone, may be used to provide a corresponding set of emulated trunk lines to a PBX or key telephone system.

The interconnect device 10, using the interface 14, emulates the behavior of a standard wired telephone trunk line to a central office. A cellular telephone owner can connect the interconnect unit by means of standard modular telephone jack (e.g., an RJ-11 four wire jack commonly used to connect to standard 4-wire (two line) category 5 household telephone wiring as illustrated at 16 in FIG. 1. Others can reach the cellular phone owner at a single telephone number (the cellular phone number) whether she is traveling or at home or at the office and the cellular phone is within range of the interconnect device. When the owner is at home or in the office, an incoming call can be received at any connected wired telephone, and an outgoing call can be placed using the cellular phone line as an additional outside line from any connected wired telephone. The superior interface of the wired phones can be used to provide call transfer functions, allow multiple users to share the line, and connect to high quality speakerphones.

Figure 5:
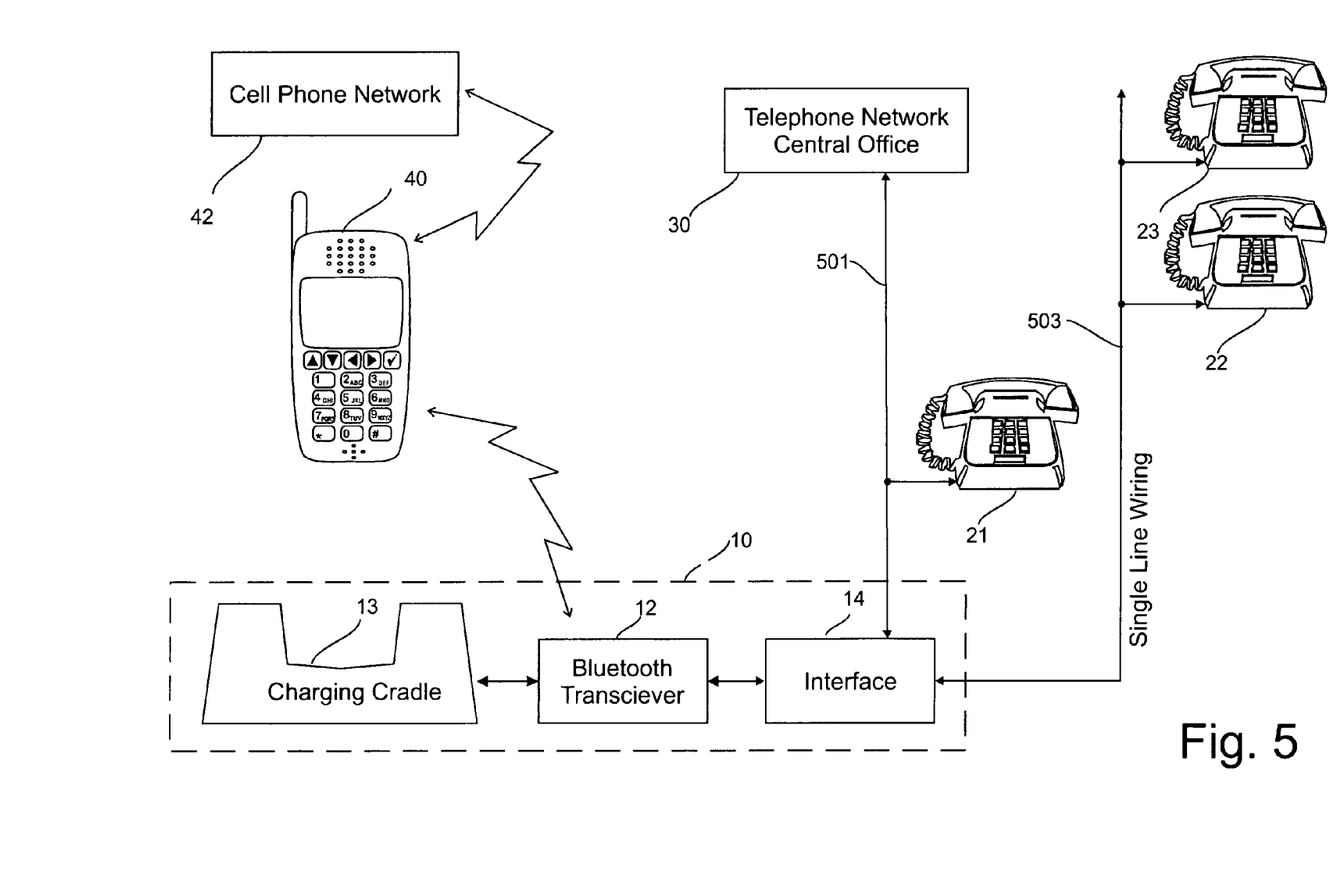
FIG. 5 is a block diagram of an interconnect device used to provide an alternative or replacement outside trunk line connection to a local wired telephone network.

FIG. 5 illustrates the use of the interconnect device 10 as in FIG. except that, instead of being connected to one line of a two-wire telephone network, the interface 14 is instead connects single wire telephone network 503 either to the transceiver 12 or to a wired trunk line 501 to a remote central office 30 of the pubic switched telephone network (PSTN). The interface 14 of FIG. functions as described above in connection with FIG. 1, with the following exceptions: (1) when one of the telephones 22–23 goes off-hook, a connection is established to the central office 30 in the usual fashion via a normally ON switch 506 that connects the single line telephone network 503 and the trunk line 501, resulting in a dial tone from the central office 30 being heard in the off-hook telephone. If the user presses a particular touch tone key (e.g. the "*" key) on the off-hook telephone, the connection to the central office via trunk 501 is terminated by the interface 14 by opening switch 506 and closing normally open switch 508 and a dial tone is instead applied to the line 503 by the interface 14, allowing the user to instead dial an outgoing call via the transceiver 12 and the cellular phone 40.

While a call is in progress via the cellular phone, switch 508 is closed and the outbound trunk line 501 is disconnected from the line 503 by the open switch 506. A connection (not shown) is also applied across the "tip and ring" lines of the line 501 by the interface 14 when the switch 506 is opened, thereby maintaining an "on-hook" condition on line 501 as seen from the central office 30. Should a ringing signal be received from the central office 30 via line 501 be detected while a call via the cellular link is in progress, the off hook telephone is sent a "call waiting" signal which the interface 14 applies via line 503, allowing the user to terminate the cellular call and answer the call from the central office. While a call is in progress via the trunk line 501 to the central office, an incoming call to the cellular phone 40 is handled by providing a call waiting signal to the off hook telephone, allowing the user to terminate the land line call and answer the call on the cellular phone.

Note that the telephone 21 seen in FIG. 5 is directly connected to the outgoing central office trunk line 501. Unlike telephones 22 and 23 which are connected to line 503 from the interface 14, the telephone 21 can be isolated from the cellular phone 40 by the interface 14. Thus, the telephone 21 may be used to place or receive a call via the central office 30 while the telephones 22 or 23 are being used to communicate via the cellular phone. As long as the cellular phone is not in use, however, the interface 14 connects the trunk 501 to the local network line 503, and the telephones 21, 22 and 23 operate as "extension phones" on a shared party line.

The interface 14 seen in the arrangement of FIG. 5 may also be used when the trunk line 501 is totally disconnected or inoperative. In this case, the communications pathway provided by the transceiver 12 and the cellular phone 40 forms the only link to the outside world. Thus, a cellular phone owner could use the interconnect device as a substitute for conventional wired telephone service when at home or in the office, and use the cellular phone as a portable device when traveling.

Many cellular phone owners subscribe to wireless phone plans which include long distance service and free calls on nights and weekends. The interconnect device contemplated by the present invention permits users to take advantage of these services when calling from their wired system.

Frequently, some home and office locations provide good cellular telephone connections to the cellular network only in certain rooms. The interconnect device allows the cellular telephone to be placed where a good connection can be achieved while, at the same time, cellular phone services can be accessed anywhere a wired system phone (including cordless phones connected to wired base stations) might be located.

Conclusion

It is to be understood that the methods and apparatus which have been described above are merely illustrative applications of the principles of the invention. Numerous modifications may be made by those skilled in the are without departing from the true spirit and scope of the invention.

What is claimed is:

1. A interconnect device for coupling a cellular telephone to at least one wired telephone via a wired telephone network, said interconnect device comprising, in combination, a first short-range radio transceiver for exchanging voice and data signals with a second short-range radio transceiver in said cellular telephone, an interface connected between said wired network and said first short-range transceiver for emulating a wired line connection from said wired telephone to a telephone central office, said interface including means for handling an outgoing call from said wired telephone via said cellular phone comprising:

means for indicating the availability of an idle line when said first and second transceivers are within communicating range of one another and said cellular telephone is not already in use, means for receiving a telephone number to be called via said wired network from said wired telephone, and means for transmitting said telephone number via said first and second transceivers to said cellular telephone to initiate said outgoing call, and means for handling an incoming call to said cellular phone from an outside caller comprising:

means for applying a ringing signal to said wired network when an incoming call is detected by said cellular phone, means responsive to said wired telephone thereafter going off-hook for establishing an audio transmission channel between said cellular phone and said wired telephone via said wired network and said first and second transceivers, and means responsive to said wired telephone thereafter going on-hook for disconnecting said audio transmission channel and for signaling said cellular phone to terminate the connection via said cellular telephone to said outside caller.

2. A interconnect device as set forth in claim 1 wherein said interface includes a switch for selectively connecting said wired telephone network either to said first short-range transceiver or to a wired trunk line to a telephone central office.

3. A interconnect device as set forth in claim 2 wherein said switch is responsive to a control signal from said wired telephone.

4. A interconnect device as set forth in claim 2 wherein said interface includes means for sending a call waiting signal to said wired telephone when a call is in progress via either said first transceiver or said wired trunk line and a new incoming call is received by said interface from said first transceiver or said wired trunk line.

5. A interconnect device as set forth in claim 1 wherein said means for indicating the availability of an idle line comprises means for applying a dial tone to said wired network.

6. A interconnect device as set forth in claim 5 wherein said means for receiving a telephone number to be called comprises means for receiving DTMF signals from said wired network and converting said signals into equivalent data signals sent via said first radio transceiver to said second radio transceiver.

7. A interconnect device as set forth in claim 1 wherein said first and said second short-range radio transceivers operate in accordance with the Bluetooth Specification.

8. A interconnect device as set forth in claim 7 wherein said means for indicating the availability of an idle line comprises means for applying a dial tone to said wired network.

9. A interconnect device as set forth in claim 8 wherein said means for receiving a telephone number to be called comprises means for receiving DTMF signals from said wired network and converting said signals into equivalent data signals sent via said first radio transceiver to said second radio transceiver.

10. A interconnect device as set forth in claim 1 wherein said means for receiving a telephone number to be called comprises means for receiving DTMF signals from said wired network and converting said signals into equivalent data signals sent via said first radio transceiver to said second radio transceiver.

11. A interconnect device as set forth in claim 1 wherein said wired telephone network includes a PBX connected by at least one trunk line to a telephone central office and wherein said interconnect device is connected to said PBX to provide the capabilities of an additional outside trunk line to said PBX.

12. A interconnect device as set forth in claim 1 wherein said wired telephone network includes at least two parallel communication paths for handling at least two calls simultaneously and wherein said interface is connected to one of said two parallel communication paths.

13. A method for coupling a cellular telephone to at least one wired telephone on a wired telephone network comprising, in combination, the steps of:

connecting an interface device between said wired telephone network and a first short-range radio transceiver for exchanging voice and data signals with a second short-range radio transceiver in said cellular telephone, employing said interface device to handle an outgoing call from said wired telephone via said cellular phone by performing the substeps comprising:

indicating the availability of an idle line to said wired telephone when said first and second transceivers are within communicating range of one another and said cellular telephone is not already in use, receiving a telephone number to be called via said wired network from said wired telephone, transmitting said telephone number via said first and second transceivers to said cellular telephone to initiate said outgoing call, and establishing an audio transmission channel between said cellular telephone and said wired telephone via said wired network and said first and second transceivers after said outgoing call is initiated, disconnecting said audio transmission channel and for signalling said cellular phone to terminate the connection via said cellular telephone to said outside caller when said wired telephone goes on-hook, and employing said interface device for handling an incoming call to said cellular phone from an outside caller by performing the substeps comprising:

applying a ringing signal to said wired telephone network when said incoming call is detected by said cellular phone, establishing an audio transmission channel between said cellular phone and said wired telephone via said wired network and said first and second transceivers when said wired telephone goes off-hook, and disconnecting said audio transmission channel and for signaling said cellular phone to terminate the connection via said cellular telephone to said outside caller when said wired telephone goes on-hook.

14. A method as set forth in claim 13 wherein said first and said second short-range radio transceivers operate in accordance with the Bluetooth Specification.

15. A method as set forth in claim 13 further including the step performed in response to a command from said wired telephone of selectively connecting said wired telephone network either to said first short-range transceiver or to a wired trunk line to a telephone central office.

16. A method as set forth in claim 15 further comprising the step of sending a call waiting signal to said wired telephone when a call is in progress via either said first transceiver or said wired trunk line and a new incoming call is received by said interface from said first transceiver or said wired trunk line.

17. A method as set forth in claim 13 wherein said step of receiving a telephone number to be called comprises receiving DTMF signals from said wired network and converting said signals into equivalent data signals sent via said first radio transceiver to said second radio transceiver.

18. A method as set forth in claim 13 wherein said wired telephone network includes a PBX connected by at least one trunk line to a telephone central office and wherein said interconnect device is connected to said PBX to provide the capabilities of an additional outside trunk line to said PBX.

19. A method as set forth in claim 13 wherein said wired telephone network includes at least two parallel communication paths for handling at least two calls simultaneously and wherein said interface is connected to one of said two parallel communication paths.

* * * * *